United States Patent [19]

Meleka et al.

[11] 4,035,604
[45] July 12, 1977

[54] METHODS AND APPARATUS FOR FINISHING ARTICLES

[75] Inventors: Abdou Hanna Meleka, Bristol; Herbert Hilary Hall Watson, Abingdon; Eric Stanley Hotston, Wantage, all of England

[73] Assignee: Rolls-Royce (1971) Limited, London, England

[21] Appl. No.: 597,335

[22] Filed: July 21, 1975

Related U.S. Application Data

[63] Continuation-in-part of Ser. No. 431,779, Jan. 8, 1974, abandoned.

[30] Foreign Application Priority Data

Jan. 17, 1973  United Kingdom ............. 02522/73

[51] Int. Cl.² .......................................... B23K 9/00
[52] U.S. Cl. ............................... 219/121 P; 219/68; 219/121 R; 315/111.2
[58] Field of Search ............. 219/121 P, 121 R, 74, 219/75, 76, 130, 137 R, 136, 68, 69 M, 124, 69; 313/231.3, 231.4; 315/111.2, 111.7, 111.8

[56] References Cited

U.S. PATENT DOCUMENTS

| | | | |
|---|---|---|---|
| 3,264,508 | 8/1966 | Lai et al. | 219/121 P X |
| 3,346,717 | 10/1967 | Pugh et al. | 219/121 P |
| 3,347,698 | 10/1967 | Ingham, Jr. | 219/121 P X |
| 3,523,834 | 8/1970 | Hewins | 219/68 |
| 3,546,522 | 12/1970 | Thorpe | 313/231.3 |
| 3,582,604 | 6/1971 | Bykhovsky | 219/121 P |
| 3,586,905 | 6/1971 | Bignell | 315/111.2 |
| 3,596,047 | 7/1971 | Maniero | 219/121 P |
| 3,694,618 | 9/1972 | Poole et al. | 219/121 P |
| 3,783,227 | 1/1974 | Aitken | 219/121 P |

FOREIGN PATENT DOCUMENTS 1,170,017  11/1969  United Kingdom

*Primary Examiner*—Bruce A. Reynolds
*Assistant Examiner*—Mark H. Paschall
*Attorney, Agent, or Firm*—Stevens, Davis, Miller & Mosher

[57] ABSTRACT

The disclosure of this invention pertains to the method of removing burrs from an electrically conductive article by exposing the article to a plasma flame wherein the parameters of the plasma are so chosen that the plasma becomes concentrated at the burrs and the consequent concentration of heat in the burrs causes the burrs to vaporize or otherwise diminish. The disclosure also pertains to apparatus for supporting the article and moving relative to the flame for a deburring operation.

10 Claims, 8 Drawing Figures

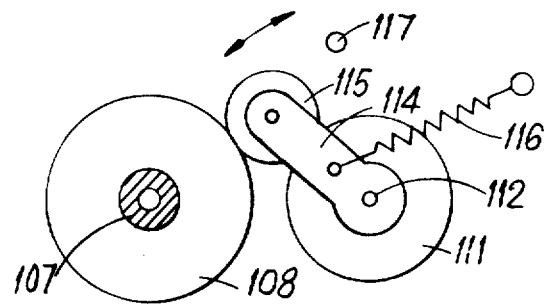
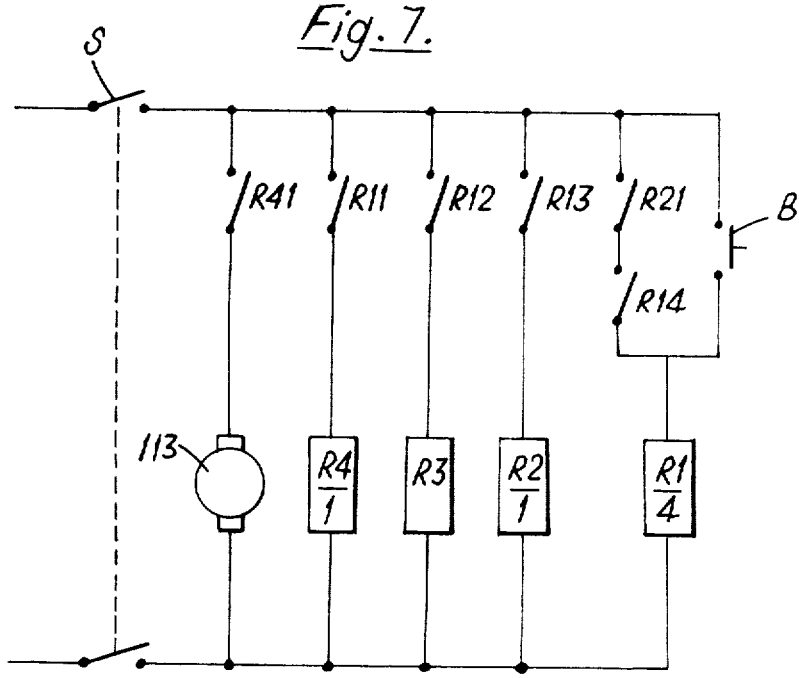

METHODS AND APPARATUS FOR FINISHING ARTICLES

This invention relates to methods and apparatus for finishing articles and is a continuation-in-part of the disclosure contained in our earlier application Ser. No. 431,779, filed Jan. 8, 1974, now abandoned. In particular the invention relates to methods of deburring articles, to apparatus for use in such methods and to articles subjected to such methods and/or deburred in such apparatus.

A method is known of thermal deburring of metal articles in which the metal articles to be deburred are subjected to the high pressure and temperature of a detonated explosive or combustible mixture of gases within a high pressure vessel. In common form of this thermal process, the combustion energy of two reactive gases, such as a hydrogen oxygen explosion, is used to produce flash heating of the burrs on a component. The heat from this explosion is supplied to the whole of the component, but due to the very short duration of its application and the difference in surface area/thermal capacity of the component and the burring, the burring is heated to a much greater temperature then is the remainder of the component. The effect of the process can be enhanced and made more selective if the initial heating of the burr enables it to reach the ignition temperature at which it can react exothermically with the gaseous atmosphere.

This conventional method, however, suffers from a number of disadvantages. These disadvantages include the necessity to operate in a high pressure reaction vessel which necessitates non-continuous operation and limits the size of the components which can be treated. There is also a difficulty in simultaneously adjusting both the rate of heat transfer and its duration to take account of the diffusivity of the material and the burr thickness. The possibility also exists that the heat input required for the deburring will produce unacceptable metallurgical surface changes at the surface of the component.

The present invention seeks to provide a method and apparatus for the deburring of articles in which some or all of these disadvantages can be overcome or reduced.

According to one aspect of the invention, a method of deburring an electrically conductive article comprises energizing a gas into the plasma state and exposing the article to the plasma wherein the degree of energization is such that ions within the plasma seek out and selectively recombine at the burrs whereby the consequent concentration of recombination energy on the burrs causes the burrs to disintegrate.

According to a second aspect of the invention, apparatus for deburring conductive articles comprises means for generating a plasma flame, means for supporting the article in said flame and means for controlling the parameters of the plasma to promote ion and electron recombination at the burrs substantially irrespective of the orientation of the article with respect to the plasma.

The concentration of the plasma at the burrs and the preferential heating thereof under controlled conditions of the plasma may be explainable in terms of a process arising from the diffferent mobilities of electrons and ions arriving at the surface of the article. Because of the higher mobility of the electrons the article initially acquires with respect to the plasma a negative potential difference which attains an equilibrium value at which ions and electrons bonbard the article at the same rate. The higher electric field potential gradient at sharp edges and burrs concentrates the plasma in the sense of attracting enhanced ion bonbardment rates to these features and the associated heat release is likewise concentrated.

One parameter which may suitably be controlled to provide the desired result is the temperature of the plasma which determines the degree of ionization and which is primarily responsible for the magnitude of the potential difference between the workpiece and the plasma and the ion current density flowing to it. For practical purposes this temperature should not be less than 5000° K. On the other hand the temperature should not be so high as to create conditions leading to arcing between the plasma and the article as this would result in damage to the surface. These conditions can be established in high temperature plasmas by virtue of the differring mobilities of ions and electrons which result in a net charge on the article which promotes the possibility of arc discharge. This makes it preferable to limit the plasma temperature to a value below about 50,000° K.

Also for the avoidance of damage by arcing it is preferable to use a process of plasma generation wherein a flame of the plasma emanates into a position clear of the generating circuit, i.e. a process in which the article is not part of the plasma generating circuit or is not situated between plasma generating electrodes.

For a given particle density, the heat generated at the surface of the article is due largely to the energy with which the arriving ions are accelerated by said potential difference and by the recombination energy released when the arriving ions are neutralized. The heat release per incident atom due to this process can, be orders of magnitude greater than the corresponding thermal energy from an explosion. Thus, and because of the selective bonbardment of the burrs the high pressures associated with the known process are not required in the method according to the invention.

The concentration of the plasma at the burrs is in addition to any concentrations arising, as in the known process, from the higher surface/volume ratio which the burrs have relative to the remainder of the article. This means that the surface temperature rise of the article when using the method according to the invention can be considerably lower than in the known process despite the high temperature of the plasma.

It will be appreciated that the temperature rise at the burrs is considerably greater than at the body of the article. This could be relied upon to cause disintegration of the burrs by vaporization thereof but in practice we have found that this does not yield useful results. In part this is thought to be due to the burrs partially vaporizing and melting until their size relative to the workpiece dictates that larger quantities of heat are lost to the workpiece by conduction and the temperature of the burrs drops below the level at which vaporization is possible. The net result of then trying to supply further heat to the burrs is to grossly overheat the workpiece and this is undesirable.

This vaporization mechanism alone is therefore not suitable for the dispersal of the burrs and accordingly we have found it desirable to include in the plasma generating gas a gas capable of exothermic reaction with the hot burrs. One convenient gas is oxygen which is particularly beneficial inasmuch as reaction products are generally not poisonous.

Originally it was thought that the burr temperatures could be selectively increased by simply increasing the "strength" of the plasma by increasing the power input and gas flow rate and that this would have the further useful effect of reducing the time it was necessary to expose the article to the plasma, however we have now found this to be an unsatisfactory solution for the following reasons. A higher "strength" of the plasma as herein defined implies high gas flow rates through the plasma generator, in addition to producing a higher temperature therein and a higher degree of ionization. The higher jet monentum produced by the high gas flow rates adversely affects the selectivity of the plasma deburring process whereby the stronger electric field gradient at the burrs selectively attracts higher rates of ion recombination at the burrs. Thus the jet momentum of the plasma results in the heat flux from the plasma being the dominant deburring mechanism. No longer are burrs at odd orientations within the plasma removed, only those which directly face the plasma. Furthermore, the fact that the heat source is a plasma is now rather irrelevant and the heat source requires to be aimed at the specific feature it is desired to deburr. In order to limit the jet momentum to a value at which the field enhanced selectivity of the plasma for the burrs is pronounced it is necessary to limit the rate of gas flow through the plasma generator. This limit will vary for different constructions of generator and must be chosen accordingly in order that one of the significant advantages possible with plasma deburring namely that the plasma choses its own targets i.e. selects its own burrs, is not lost.

A yet further disadvantage of the high momentum plasma heat source is that, with oxygen as the exothermically reactive gas, components of metals such as mild steels tend to form molten oxide slag at the burrs which inhibits further deburring, leads to large heat inputs to the workpiece and leaves residual blobs of slag on the workpiece which are themselves difficult to remove.

We have found that in order to successfully deburr metallic workpieces it is desirable to keep the monentum at a relatively low level, and to allow the deburring time for the article to be relatively long i.e. from a few seconds to a few minutes. With longer deburring times the workpieces tend to absorb too much heat and it is therefore advantageous to provide apparatus or means for quenching the workpiece at intervals during the deburring process. Alternatively the heat absorbed by the workpiece can be controlled so that it forms part of a heat treatment applied to the workpiece.

It will be appreciated that increasing the R.F power supplied to the plasma generator will increase the temperature of the plasma, simultaneously increasing the percentage ionization within the plasma and also the gas velocity of the plasm jet. Fortunately the ionization increases exponentially with temperature whilst the gas velocity increases linearly and thus the additional particle momentum with increasing temperature, up to the limit of 50,000° K, is not sufficiently serious to neutralize the benefits achieved with increasing ionization and can be counteracted by turning down the mass flow through the plasma generator. Turning down the mass flow through the plasma generator will then require a lower quantity of power input to achieve a given degree of ionization.

A further parameter contributing to a useful rate of heat transfer to the burrs is the density of the surrounding and hence of the plasma which should not be less than around one tenth atmosphere to several atmospheres, and useful results are obtainable at atmospheric pressure so that the process can in fact be carried out without a pressure vessel.

The invention also includes articles deburred by the above process and in the above apparatus.

The invention will now be described in greater detail, by way of example, with reference to the drawings, in which:

FIG. 6 is a detail of the mechanism shown in FIGS. 4 and 5;

FIG. 7 is a circuit diagram of a suitable operating circuit for the apparatus shown in FIGS. 4, 5 and 6.

Figure 1:
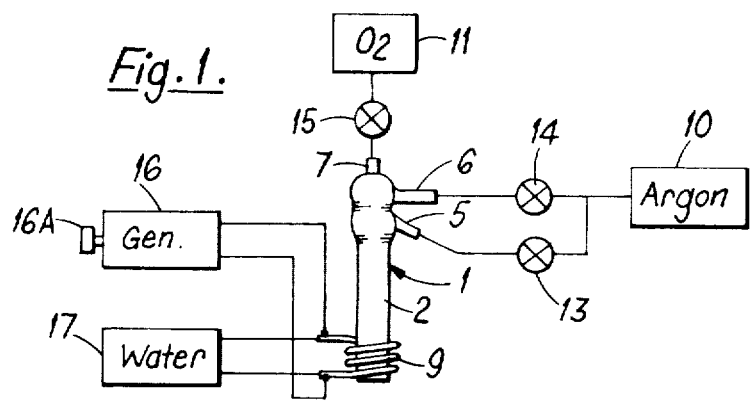
FIG. 1 is a schematic view of a plasma generator and ancillary equipment for use in accordance with the invention.
Figure 2:
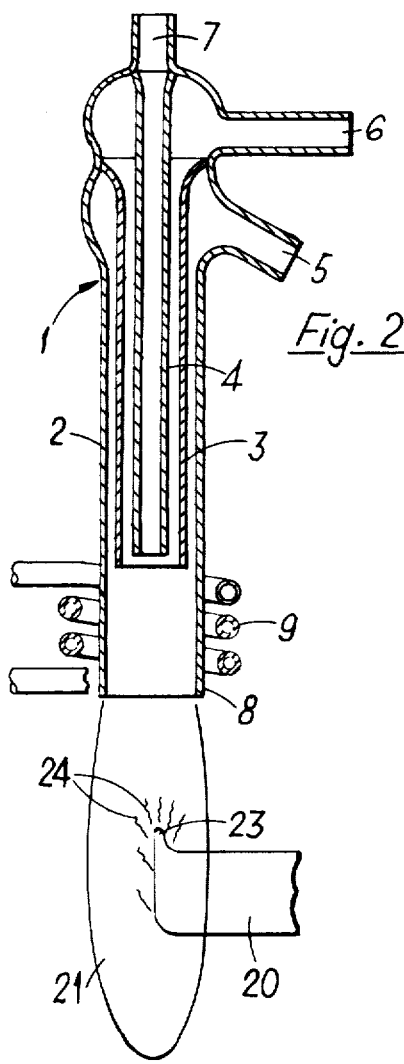
FIG. 2 is an englarged view of a plasma generating torch showing the effect of the field strengthening properties of a burr when part of an article is inserted into the plasma flame.
Figure 3:
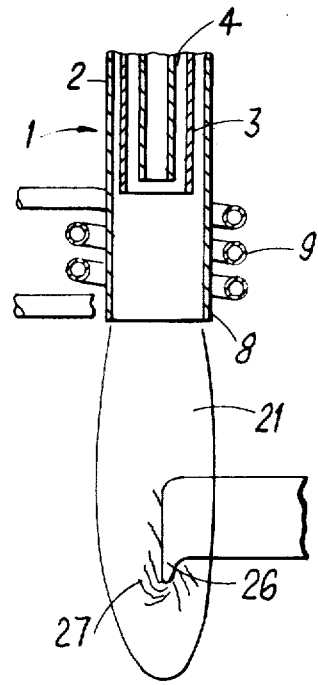
FIG. 3 is a partial view similar to the lower half of the torch shown in FIG. 2, but showing a workpiece having a burring which extends away from the plasma torch.

Referring firstly to FIGS. 1 to 3, there is shown a plasma torch 1 of the induction type. In the generally basic form shown in FIG. 2, it can be seen that the induction type plasma torch 1 comprises three concentric tubes 2, 3 and 4, all of which are of different lengths to each other, the outer being the longest and the inner the shortest, and each being provided with entry portions 5, 6 and 7 respectively for the ingress of a suitable working gas or gases. Around the outer end of the longest tube 2 of the three concentric tubes, at the part 8 which extends beyond the two inner tubes 3 and 4, there is situated a water cooled radiofrequency induction coil 9 constructed of copper tubing. As can be seen from FIG. 1, the torch is fed with argon at the two inputs 5 and 6 from an argon source 10 and with oxygen at the input 7 from an oxygen source 11, control valves for these inputs being provided at 13, 14 and 15 respectively. The oxygen input can be replaced by the argon supply for starting purposes, not indicated. A radio frequency generator 16 is provided for attachment to the radio frequency coil. A cooling water supply 17 is also provided for the coil. The power output of the generator can be varied by a knob 16A thereby to vary the thermal energy of the plasma.

The use of the torch for deburring purposes will now be described:

In order to start the torch, argon is connected to all three inputs 5, 6 and 7 of the torch 1 so as to provide flow rates of about 5 liters per minute from each input, and the radio frequency power is turned on at a lower power, for example ½ a kilowatt. The respective lengths of the tubes 2, 3 and 4 provides for turbulance of the gases in the portion 8 of the tube 2 (also referred to as the exit tube). The pointed tip of a length of tungsten wire is inserted into the mouth of the exit tube 8 of the torch and causes a spark which in turn causes the turbulent gas to break down and ionize and form a flickering or electrostatically, maintained plasma. Then the wire is withdrawn and the radio frequency power is turned up to its maximum value, in the experimental condition this was 2 kilowatts (see later description of experiment). This produces an electro-magnetically sustained plasma flame. The argon supply to the centre tube 7 is then turned off and the supply of oxygen is then substituted therefor, the oxygen flow rate being turned up to 7 liters per minute.

With this oxygen flow passing through the torch a workpiece 20, insulated from the plasma torch and optionally also from earth, can be inserted into the plasma flame 21 as is shown in FIG. 2. The insulated workpiece shown in FIG. 2 has a burr which has been orientated so that it faces the exit tube 8 of the torch. With this arrangement the workpiece will be bombarded with both ions and free electrons from the plasma. Due to the relative mass of the ions and electrons, the electrons will bombard the workpiece in greater numbers than the ions and consequently a negative charge will build up in the workpiece. As a result of the build up of this charge the ions which are present in the plasma, will be attracted to the relatively negatively charged workpiece 20 and recombination of the electrons in the charged workpiece and the ions arriving thereat will take place with the release of considerable energy. Due to the shape of the workpiece, that is to say, the presence of the relatively sharp thin burr 23, the electrostatic field built up by the negative charge will be concentrated at this burr. As a result of this, a higher rate of recombination of ions will occur at the burr 23 than elsewhere on the surface of the workpiece, and in turn a higher concentration of heat will occur in the burr than in the remainder of said surface. The preferential rate of recombination at the burr is also referred to as "concentration of the plasma" at the burrs. Further, because of the provision of oxygen in the plasma flame, a thermal reaction will take place between the oxygen and the burr material, where the material is for example steel or iron, producing the relevant oxides. This will therefore increase the rate at which the burring is removed and at the same time, the preferential charging of the burr will prevent the workpiece from being overheated as a result. The formation of the oxide on the burr and the disintegration of the whole or substantially the whole of the burr into oxide, will provide either a material which can be blown off or which can be easily removed, by, for example, a brushing action. The effect of the concentration of the energy in the region of the burr can be plainly seen in the plasma flame in the form of bright streamers. The concentration of the plasma adjacent to the burr is indicated by the lines shown at 24.

Experiment has shown that it is not necessary for the burr to be directly facing the mouth of the torch, but, provided that the burr is in fact inside the plasma flame, then the preferential treatment which was observed in the test of a burr pointing towards the torch mouth will also be observed in burrs pointing in other directions. FIG. 3 shows a situation in which a burr 26 is in fact directed in the opposite direction to the exit tube of the torch and, as can be seen, the electrostatic field 27 builds up to a maximum in the region of the burr as previously. In this way the orientation of the burr or burrs on the workpiece can be relatively immaterial.

Control of the plasma flame can readily be carried out by varying the power supplied thereto or providing for a pulsed operation. Exposure of the workpiece can be controlled by control of the dwell of the plasma flame or removal of the workpiece from the flame.

As described the system provides for a wholly gaseous atmosphere, but it is possible for an atmosphere to be augmented by vaporization of additional substances chosen for their chemical reactivity with the burr material. These substances e.g. nitrates or chlorates of potassium or ammonium, may be introduced as powders into the gas flow of the torch or into the interaction region or they may be provided as coatings on the surface of the workpiece or surrounding material.

Where reactive gas, such as oxygen is used, it is possible with more powerful plasma torches for the plasma torch to be run on pure reactive gas where radio frequency power is sufficiently high to enable the plasma generation to be maintained without the inclusion of an easily dissociated gas. The use of oxygen is suitable for many metals, but for certain metals such as those known as "super alloys" or "nimonic alloys" the oxygen will not combine readily with these alloys because of the presence of a particularly tenacious oxide film. With these alloys, unless sufficient power is available to enable the oxide film to in fact be melted so enabling the interior of the metal to be oxidized by the torch, other gases such as chlorine or gases of a similar nature, or sulphur vapour or phosphorous vapour can be used depending on composition of the material being deburred. In some cases nitrogen may be used as the reactive gas and with sufficient starting temperature, for example both iron and titanium can be burnt off. Although in virtually all plasmas some heating and removal of the burr material will occur, there is an optimum range of plasma parameters for deburring most materials. If it is required to exploit the field enhanced preferential heating of the burrs, as above described, the degree of ionization must be relatively high above 1% of the number of molecules within the gas. This sets a lower limit to the ionized gas of plasma temperature for this mode of operation at round about 5,000° K. On the other hand a preferred method of ensuring that the surface of an electrically conducting workpiece cannot be damaged by the formation of arc spots, is to keep the potential difference between the workpiece and the plasma below that required to support an arc. This makes it preferable to avoid high voltage discharges and to limit the plasma temperature to a value preferably below 50,000° K. A temperature of 20,000° K probably approximates an optimum figure. Furthermore in order to ensure a useful rate of heat transfer from a plasma of partially ionized gas in this temperature range, it is desirable to use a relatively dense high pressure plasma operting in a pressure region of around 1/10th to several atmospheres. Such a pressure range (corresponding to particle density greater than about $10^{17}$ per cc), will in any case be desirable when it is required that chemical reactions between the burr material and the atomic species in the plasma should proceed to a significant extent, in order to produce enhanced heating of the burrs and/or their conversion to easily removed reaction products as described above.

Fortunately this pressure range includes atmospheric pressure and the invention can therefore be readily carried out without the necessity of there being provided a high pressure vessel.

In an experiment using the type of torch which as been shown in FIG. 2, the torch consisted of a 30 MHz 2 kilowatt radio frequency generator connected to a water cooled copper coil having four turns at three millimeter spacing, the copper tubing having an overall diameter of 6.4 m.m. This was used on a torch having an inner tube having an overall diameter of 10 m.m. and approximately 60 m.m. long, an intermediate tube of 20 m.m. overall diameter and approximately 44 m.m. long and an outer tube of 26 m.m. overall diameter and approximately 150 m.m. long. The inner tube was set back from the intermediate tube by approximately 3 m.m.. The tubes are made out of Silica having a wall thickness of approximately 2 m.m. The RF currents flowing in the coil induced a current flow in a stream of gas at atmospheric pressure whereby the gas is ionized and heated to form an intense ball or ring of glowing gas near the mount of the tube. A "tail flame" of high temperature plasma emerged from the open end of the tube and was used to treat the workpieces or specimens to be deburred. On a test piece of mild steel used, with, for example, a burr of approximately 0.04 inches thick, the burr appeared to be substantially removed or converted into a friable residue after about 1 minute, the burr being heated up to an estimated temperature of 1000° C, during which time the parts of the other parts of the specimen had reached a temperature of about 400° C without recourse to periodic quenching.

This plasma generator produced a plasma at an estimated temperature of 10,000° K and ran on an argon-oxygen mixture containing between 30 and 50% of oxygen to enhance the exothermic reaction at the burrs. The power of this plasma generator resulted in a power density in the plasma adjacent the mouth of the torch of some 200 watts/square cm and the relative orientation of the burrs and the plasma generator did not affect the efficacy of the deburring process.

In operation it was observed that the plasma could be distinguished as a uniformly distributed glow in space and that on introduction of the burred article into the plasma bright streamers materialized in the plasma and selectively attached themselves to the burrs. Whilst this experiment was with a relatively small plasma generator there is no reason why one of the larger plasma generators currently available should not be adapted to a suitable mode of operation for carrying out the deburring of larger articles. Plasma generators are available with output openings and can be adapted for use as deburring apparatus by controlling the temperature of the plasma to lie in the range 5,000° K to 50,000° K, by limiting the momentum of the gas flow through the plasma generator, and by including suitably exothermically reactive chemicals in the gas supply to the generator. In order to cope with potential increased temperatures of the plasma generating chamber walls, it may be necessary to form the walls of a plurality of axially extending hollow strakes make of copper and cooled by flowing water. Each strake needs to be electrically insulated from the next adjacent strake and insulation protected from direct bombardment by the ions. This may be achieved by overlapping the strakes.

A suitable simple form of apparatus for carrying out deburrng on a commercial scale will now be described, although it is to be appreciated that this is only one example of many forms of possible apparatus which could be used.

This apparatus will now be described in connection with FIGS. 4, 5, 6, and 7. This apparatus is designed for deburring the gear teeth of gear wheels.

In this embodiment of the invention, the apparatus comprises an indexing table 101 which can be rotated by hand by the opertor and which is provided with four workpiece carriers 102, 103, 104 and 105. The indexing table 101 is movable through 180° in order to bring the loaded workpiece (gear wheel) from its loading station 104 to its deburring or working station 102 and to bring a finished workpiece from the working station 102 to the unloading station 104. For convenient operation, four workpiece carriers are provided as stated so that each workpiece has an intermediate position between loading (or unloading) and working stations. The indexing table 101 is provided with locating means in the form of an operator controlled latch 106 by means of which the workpiece can be located in the correct position for deburring in a manner which will be described. Each workpiece carrying shaft 107 is rotatably mounted in the indexing table and carries, at its lower end, a friction roller 108 and, at its upper end, a support carries 109 for the workpiece 110. In order to ensure rotation of the workpiece 110 with the carrier shaft 107 some form of temporary keying (not shown) can be provided.

Adjacent to the lower end of the friction roller 108 at the working station, there is provided a driving roller 111 which is keyed to the shaft 112 of an electric motor 113. Also located on the shaft of the motor are a pair of arms 114 which extend radially from the driving roller 111 and carry at their outer end an intermediate roller 115 which is permanently in engagement with the driving roller 111. The arm pair 114 is spring urged in a direction away from the friction roller 108 by means of a spring 116, and as a result of the spring force, will retain the intermediate roller 115 against a stop 117 when the drive motor 113 is not in operation. On energization of the drive motor 113 on arrival of a new workpiece 110 at the working station, the driving roller 111 will be rotated in an anti-clockwise direction thus moving the arm pair 114 against the action of the spring 116 and engaging the intermediate roller 115 with the driven roller 108 of the workpiece support shaft 107. Situated above the workpiece station is a plasma torch 119 which is suspended downwardly from a cantilever arm 120. The torch 119 is connected by means of pipes 121 and control valves 122 to a gas source and control arrangement 123 on one side of the cantilever arm 120 and is connected to the necessary electrical supply 124 provided at the other side of the arm.

The circuitry provided for operating the apparatus (FIG. 7) comprises a main two pole on/off switches connected to the electrical supply, a first relay R1/4 controlled by an operator's push button B for energizing the electric motor 113 which provides for the rotation of the workpiece under the plasma generator, through relay R4/1 and contact R11, the relay R1/4 being provided with further contacts R12 and R13 and a holding contact R14. In the holding circuit of contact R14 a break contact R21 of a delay relay R2/1 is provided which shuts off the main relay R1/4 at the end of an operation in dependence on the delay time of relay R2/1. Contacts R12 and R13 control respectively a relay R3 for turning up the electric power to the plasma torch, adjusting the gas supply and for operation of the delay relay R2/1. The operation of the apparatus will now be described.

At the start of the operation, the operator will ignite the plasma torch and will position the workpieces (gear wheels) to be deburred on the first two carriers 102 and 105. Then the indexing table is rotated to bring the first workpiece 110 and carrier 102 into line under the plasma gun whereupon the indexing table is retained in position by means of latch 106 which engages in a suitable recess 125 in the table 101. The operator then presses his button B which acutates the main relay R1/4. The motor 113 is energized through contact R11, relay R4/1 and R14, the plasma power is turned up through R12 and relay R3 and the delay relay through R13. The relay R1/4 is held in its operative stage by means of its holding contact R14. The motor, on intermediate sets the workpiece in rotation by engagement of the intermedate roller 115 with the roller 108 of the workpiece shaft 107.

The workpiece continues to rotate until the deburring process is completed, this time being determined by the delay of the delay relay R2/1 which then, after its predetermined delay, opens the contact R12 in the holding circuit of the relay R1/4 and as a result, the high power to the plasma torch 119 and the motor 113 and the delay relay R2/1 are shut off. As a result the deburring operation is completed.

In the meantime the operator has placed a new workpiece on the vacant position 104 in front of him and, as soon as the deburring has been completed, he releases the indexing table 101, turns the table to place the next workpiece in the working position and a supply of workpieces for deburring is provided at the working station with a minimum of delay.

It will be appreciated that many kinds of apparatus can be used for the deburring process. Thus, for example, conveyor belts can be used and different methods of detecting completion of a deburring can be carried out, in particular in the case of the gear wheel deburring apparatus, for example, by detecting the number of rotations which the gear wheel being deburred has made.

Figure 4:
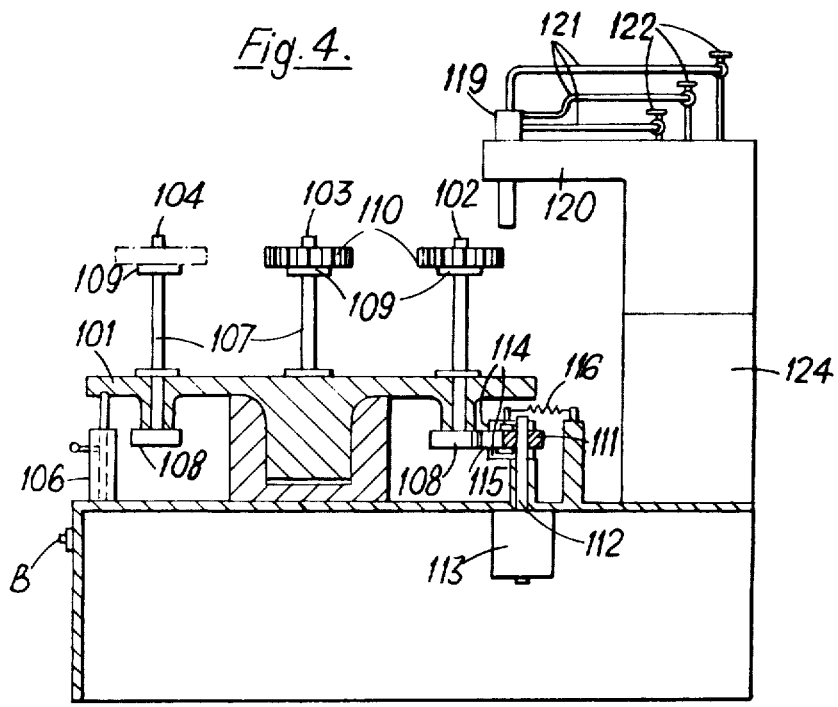
FIG. 4 is a side view of an apparatus in accordance with the invention suitable for deburring gear teeth.
Figure 5:
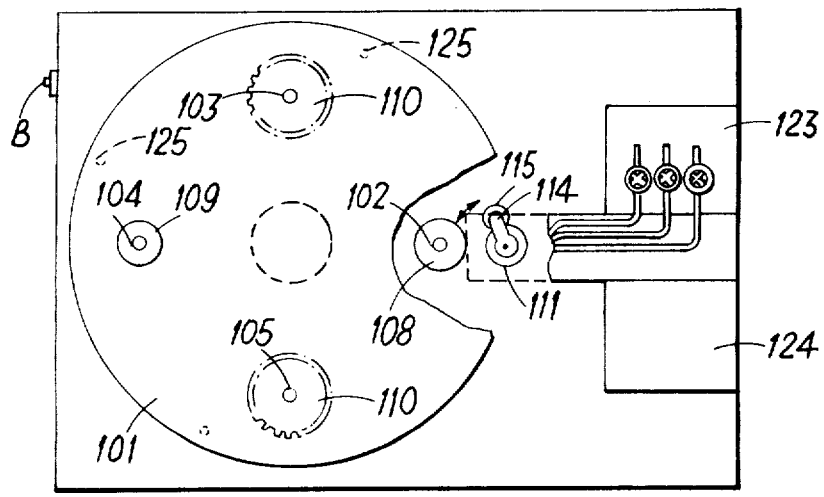
FIG. 5 is a plan view of the apparatus shown in FIG. 4.
Figure 8:
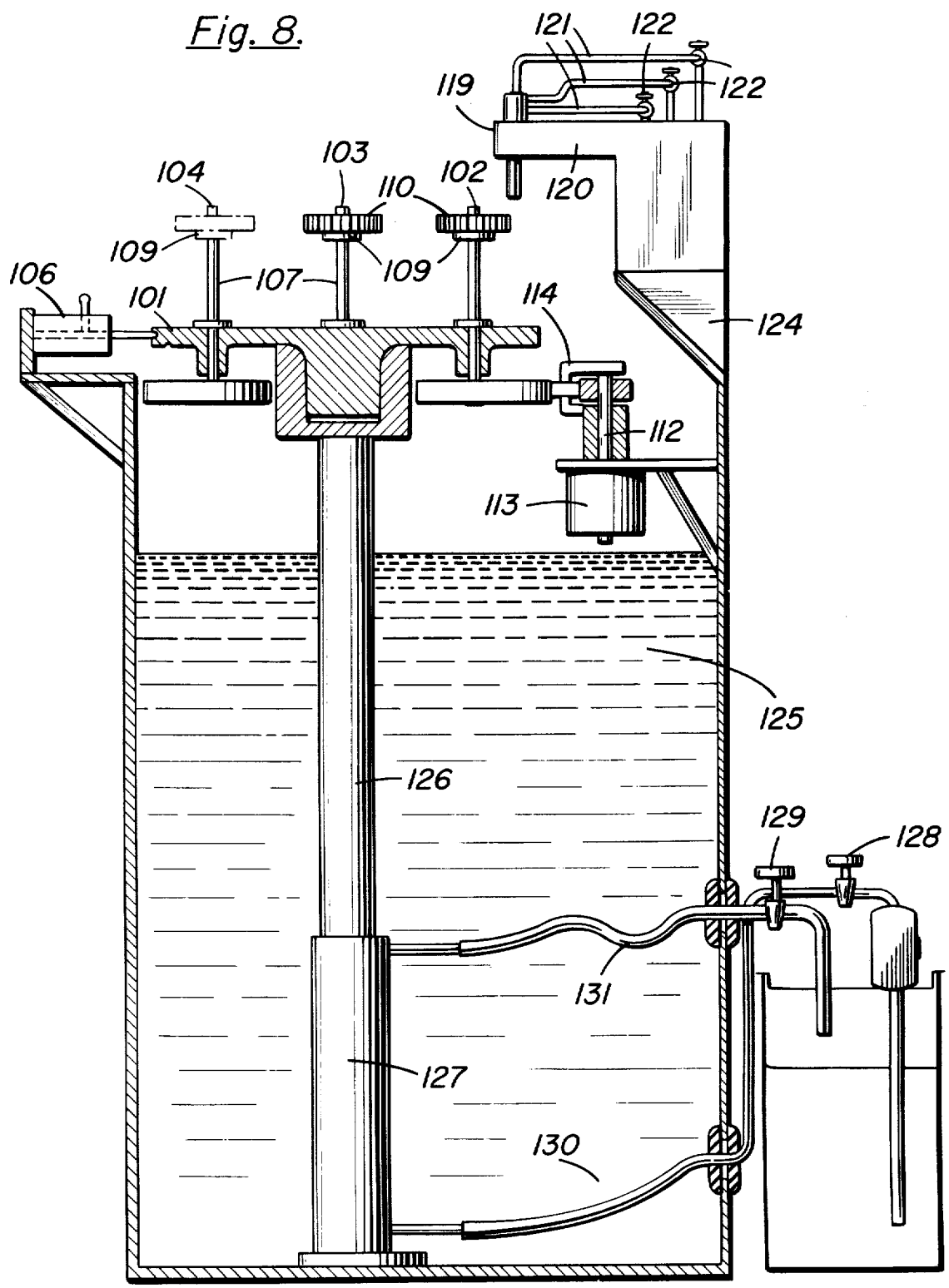
FIG. 8 is a schematic view of a modification of the apparatus of FIG. 4.

Turning now to FIG. 8 it will be seen that the apparatus of FIG. 4 is shown slightly modified to allow quenching of the deburred or partially deburred workpiece. This quenching operation may be necessary if the time required for the deburring operation is sufficiently long that the workpiece may be prone to overheating, in which case one or more quenchings can be utilized or alternatively the deburring operation may be incorporated with a heat treatment of the workpiece.

In the embodiment quenching of the workpiece is achieved by mounting the workpiece support table (101) above a quench bath 125 into which the table and workpieces may be lowered, and subsequently withdrawn from, by a hydraulic piston 126 in cyclinder 127 disposed underneath the rotational centre of the indexing table. Operation of the hydraulic piston and cylinder arrangement can either be by way of further electrical switching (not shown) but which would be incorporated into the relay circuit of FIG. 7 or simply by means of two valves 128,129 disposed in the pressure supply and return lines 130,131 respectively and operable by the operator of the deburring process.

From the above it will be seen that the invention provides a method of deburring workpieces of a metalic nature by means of a plasma flame which can be easily controlled by controlling the duration of the time the workpiece is subjected to the plasma, by controlling the temperature and degree of ionization present within the plasma and by suitable choice of chemicals capable of exothermic reaction with the workpieces involved. Due to the possibility of operating in atmospheric conditions, pressure chambers, which have been necessary with the known explosive reaction process of deburring, are no longer necessary.

We claim:

1. A method of removing a burr from an electrically conductive article with a plasma generator comprising the steps of energizing a gas into a plasma at a temperature between 5000° K and 50,000° K with the plasma generator, controlling the rate of gas flow through the plasma generator to limit the jet momentum to a value allowing selective destruction of the burrs, exposing the article to the plasma substantially to avoid arcing between the article and the plasma generator and allowing the recombination of ions present within the plasma at the burr whereby the temperature of the burr is elevated relative to the body of the article and utilizing means capable of exothermic reaction with the burr at the said elevated temperature.

2. The method according to claim 1 wherein there is further provided means for controlling the time for which the article is exposed to the plasma.

3. The method according to claim 1 wherein said means capable of exothermic reaction comprises at least a constituent of the gas energized by the plasma generator.

4. The method according to claim 1 wherein said means capable of exothermic reaction comprises a powder introduced into the plasma via the plasma generator.

5. The method according to claim 1 wherein said means capable of exothermic reaction comprises a chemical applied to the surface of the article.

6. The method according to claim 1 and wherein the method is carried out at atmospheric pressure.

7. The method according to claim 1 and wherein the article is subjected to a quench during said removal of the burr to substantially prevent overheating of the body of the article.

8. The method according to claim 7 and wherein said quench forms part of a heat treatment applied to the article.

9. Apparatus for deburring an electrically conductive article, comprising means for generating a plasma, means for supporting the article to be deburred and for exposing the article to said plasma, means for controlling the temperature of the plasma to lie in the range 5000° –50,000° K and valve means for controlling the gas flow rate through the plasma generator to a value at which the plasma selectively destroys burrs on the article and wherein there is provided means capable of exothermic reaction with the burrs at the elevated temperature of the burrs relative to the article achieved by recombination of ions at the burrs.

10. Apparatus according to claim 9 and including means for quenching said article during said deburring process to cool the body of the article.

* * * * *